(12) United States Patent
Shirani-Mehr et al.

(10) Patent No.: US 9,344,170 B2
(45) Date of Patent: May 17, 2016

(54) METHOD AND APPARATUS FOR FEEDBACK IN 3D MIMO WIRELESS SYSTEMS

(71) Applicant: Intel Corporation, Santa Clara, CA (US)

(72) Inventors: Hooman Shirani-Mehr, Portland, OR (US); Alexei Davydov, Nizhny Novgorod (RU); Jong-Kae Fwu, Sunnyvale, CA (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 14/511,792

(22) Filed: Oct. 10, 2014

(65) Prior Publication Data

US 2015/0139121 A1 May 21, 2015

Related U.S. Application Data

(62) Division of application No. 13/719,343, filed on Dec. 19, 2012, now Pat. No. 8,885,752.

(60) Provisional application No. 61/676,775, filed on Jul. 27, 2012.

(51) Int. Cl.
*H04L 27/00* (2006.01)
*H04B 7/04* (2006.01)
(Continued)

(52) U.S. Cl.
CPC .............. *H04B 7/046* (2013.01); *H04B 7/0417* (2013.01); *H04B 7/0452* (2013.01);
(Continued)

(58) Field of Classification Search
CPC . H04W 24/04; H04W 72/046; H04W 72/042; H04W 72/0413; H04W 36/0083; H04W 88/08; H04W 36/04; H04B 7/0417; H04B 7/046; H04B 7/0452; H04B 7/0639; H04B 7/0478; H04B 7/0469; H04L 5/0053; H04L 5/0055; H04L 1/1812; Y02B 60/50
USPC .......................................................... 375/295
See application file for complete search history.

(56) References Cited

U.S. PATENT DOCUMENTS 8,885,752 B2   11/2014  Shirani-Mehr et al.
2005/0157807 A1  7/2005  Shim et al.
(Continued)

FOREIGN PATENT DOCUMENTS

EP    2648445 A1   10/2013
WO   2009107090 A1   9/2009
WO   2012108913 A1   8/2012

OTHER PUBLICATIONS

3GPP TR 36.873, "Technical Specification Group Radio Access Network; Study on 3D channel model for LTE (Release 12)", V1.2.0, Sep. 2013, 33 pages.
(Continued)

*Primary Examiner* — Juan A Torres
(74) *Attorney, Agent, or Firm* — Stoel Rives LLP (57) ABSTRACT

Systems and methods provide channel state information feedback in a multiple-input multiple-output (MIMO) system. A method quantizes a pre-coding matrix indicator (PMI) and feeds it back from a user equipment (UE) to an evolved Node B (eNodeB). The method may use codebooks for vector quantization of optimal horizontal direction and a scalar quantizer to quantize an optimal vertical direction from the eNodeB to a selected UE.

9 Claims, 8 Drawing Sheets

(51) Int. Cl.
    *H04W 24/04* (2009.01)
    *H04W 36/00* (2009.01)
    *H04B 7/06* (2006.01)
    *H04L 1/18* (2006.01)
    *H04L 5/00* (2006.01)
    *H04W 72/04* (2009.01)
    *H04W 36/04* (2009.01)
    *H04W 88/08* (2009.01)

(52) U.S. Cl.
    CPC .......... *H04B 7/0469* (2013.01); *H04B 7/0478* (2013.01); *H04B 7/0639* (2013.01); *H04L 1/1812* (2013.01); *H04L 5/0053* (2013.01); *H04L 5/0055* (2013.01); *H04W 24/04* (2013.01); *H04W 36/0083* (2013.01); *H04W 72/042* (2013.01); *H04W 72/046* (2013.01); *H04W 72/0413* (2013.01); *H04W 36/04* (2013.01); *H04W 88/08* (2013.01); *Y02B 60/50* (2013.01)

(56) References Cited

U.S. PATENT DOCUMENTS

| | | |
|---|---|---|
| 2007/0155336 A1 | 7/2007 | Nam et al. |
| 2008/0080449 A1 | 4/2008 | Huang et al. |
| 2008/0233902 A1 | 9/2008 | Pan et al. |
| 2009/0202014 A1 | 8/2009 | Mujtaba et al. |
| 2010/0118989 A1 | 5/2010 | Sayana et al. |
| 2011/0019775 A1 | 1/2011 | Ruscitto et al. |
| 2011/0149765 A1 | 6/2011 | Gorokhov et al. |
| 2011/0150114 A1 | 6/2011 | Miao et al. |
| 2011/0164696 A1 | 7/2011 | Choi et al. |
| 2011/0194504 A1 | 8/2011 | Gorokhov et al. |
| 2011/0211628 A1 | 9/2011 | Hammarwall et al. |
| 2011/0211656 A1 | 9/2011 | Kent et al. |
| 2011/0244847 A1 | 10/2011 | Mallik et al. |
| 2011/0268166 A1 | 11/2011 | Chen et al. |
| 2011/0274185 A1 | 11/2011 | Gan et al. |
| 2011/0280188 A1 | 11/2011 | Jeon et al. |
| 2011/0317748 A1 | 12/2011 | Li et al. |
| 2012/0008613 A1 | 1/2012 | Lee et al. |
| 2012/0014424 A1 | 1/2012 | Heath et al. |
| 2012/0029924 A1* | 2/2012 | Duni .................... G10L 19/038 704/500 |
| 2012/0033566 A1 | 2/2012 | Porat et al. |
| 2012/0114064 A1 | 5/2012 | Kotecha et al. |
| 2012/0250608 A1 | 10/2012 | Wang et al. |
| 2012/0281783 A1 | 11/2012 | Cheng et al. |
| 2013/0230081 A1* | 9/2013 | Wernersson ......... H04B 7/0617 375/219 |
| 2013/0242773 A1 | 9/2013 | Wernersson et al. |
| 2013/0258964 A1 | 10/2013 | Nam et al. |
| 2013/0265899 A1 | 10/2013 | Sayana et al. |
| 2013/0308714 A1* | 11/2013 | Xu ....................... H04B 7/0417 375/267 |
| 2015/0124736 A1 | 5/2015 | Ko et al. |

OTHER PUBLICATIONS

Final Office Action received for U.S. Appl. No. 13/719,343, mailed on Apr. 9, 2014, 19 pages.

Non-Final Office Action received for U.S. Appl. No. 13/719,343, mailed on Jan. 6, 2014, 13 pages.

D'Amico, "Innovative advanced signal processing algorithms for interference avoidance" Dec. 31, 2010, 19 pages.

Gesbert, "Interference Avoidance Techniques and System Design", 3D beamforming, Jul. 15, 2012, 41 pages.

International Searching Authority, International Search Report and Written Opinion received for PCT Patent Application No. PCT/US2013/047323, mailed on Oct. 11, 2013, 13 pages.

* cited by examiner

METHOD AND APPARATUS FOR FEEDBACK IN 3D MIMO WIRELESS SYSTEMS

RELATED APPLICATION

This application is a division of U.S. patent application Ser. No. 13/719,343, filed Dec. 19, 2012, which claims the benefit under 35 U.S.C. §119(e) of U.S. Provisional Application No. 61/676,775, filed Jul. 27, 2012, each of which is hereby incorporated by reference herein in its entirety.

TECHNICAL FIELD

This disclosure relates to wireless communication networks. Specifically, this disclosure relates to systems and methods for providing channel state information feedback in a multiple-input multiple-output system.

BACKGROUND

In wireless communication systems, multiple-input multiple-output (MIMO) technology is used to increase transmission capacity and quality. MIMO technology may find use in a variety of applications including, for example, 3G and 4G systems, such as in third generation partnership project (3GPP) long term evolution (LTE) networks and/or LTE-Advanced networks, the Institute of Electrical and Electronics Engineers (IEEE) 802.16 standard (e.g., 802.16p), which is commonly known to industry groups as WiMAX (Worldwide interoperability for Microwave Access), and the IEEE 802.11 standard, which is commonly known to industry groups as WiFi. In 3GPP radio access networks (RANs) in LTE systems, the transmission station can be a combination of Evolved Universal Terrestrial Radio Access Network (E-UTRAN) Node Bs (also commonly denoted as evolved Node Bs, enhanced Node Bs, eNodeBs, or eNodeBs) and Radio Network Controllers (RNCs) in an E-UTRAN, which communicates with the wireless mobile device, known as a user equipment (UE).

To achieve better spatial multiplexing with a high transmission rate, a transmitter (e.g., at an access point or base station such as an eNodeB) performs beamforming and power allocation according to channel state. A receiver (e.g., at user's mobile phone or other UE) measures channel state information (CSI) and provides feedback to the transmitter. The CSI of a MIMO system may be represented by a matrix having a plurality of complex elements. Based on the number of antennas and users, the CSI matrix may be very large. To reduce the overhead of the uplink channel, some wireless systems use a codebook-based pre-coding method where the UE selects a pre-coding matrix from a codebook according to the measured CSI matrix, and feeds back an index corresponding to the selected pre-coding matrix to the eNodeB. The eNodeB then obtains the pre-coding matrix by looking up the codebook according to the index, and pre-codes data to be transmitted using this pre-coding matrix (e.g., in single-user MIMO) or a newly calculated pre-coding matrix based on the pre-coding matrices received from multiple UEs (e.g., in multi-user MIMO).

DETAILED DESCRIPTION

A detailed description of systems and methods consistent with embodiments of the present disclosure is provided below. While several embodiments are described, it should be understood that disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

Figure 1:
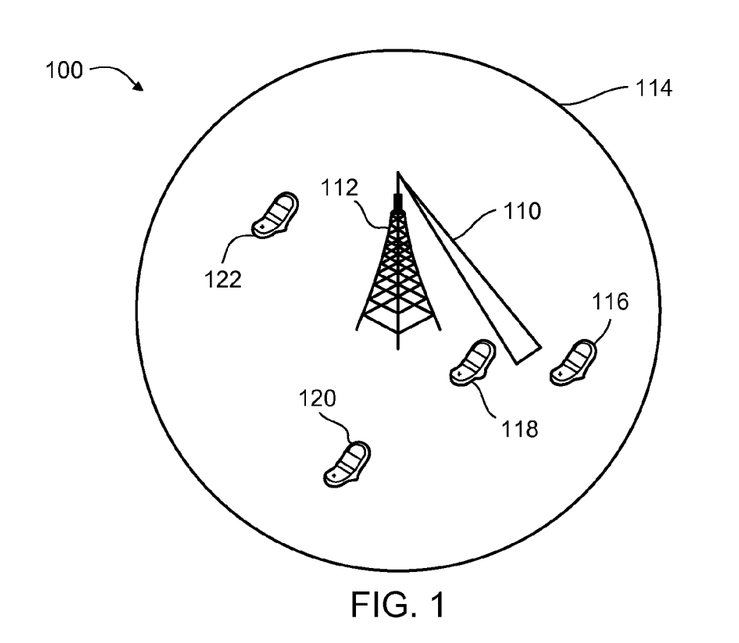
FIG. 1 is a block diagram of a mobile communication system applying horizontal beamforming to transmit a beam at a fixed vertical angle.

As discussed above, a base station such as an eNodeB in a MIMO system may achieve better spatial multiplexing with a high transmission rate by performing beamforming and power allocation according to channel state. While a one-dimensional (1D) antenna array may be used for horizontal beamsteering, many systems using a 1D antenna array transmit radio frequency (RF) beams at a fixed vertical angle. For example, FIG. 1 is a block diagram of a mobile communication system 100 applying horizontal beamforming to transmit an RF beam 110 from an eNodeB 112 at a fixed vertical angle that is common across a cell 114 and is not user-specific. As illustrated in FIG. 1, this causes a reduction in received signal power at an intended UE 116 when the actual vertical angle from the eNodeB 112 to that UE 116 is different from the vertical tilting angle of the RF beam 110 used by the eNodeB 112. Moreover, using a 1D antenna array (not shown), the eNodeB 112 may not be able to minimize intra-cell and inter-cell interferences. Thus, the signal leakage to other UEs 118, 120, 122 in the system may be relatively large.

System throughput may be increased and performance improved by using three-dimensional (3D) beamforming where a two-dimensional (2D) antenna array steers one or more transmit RF beams in both horizontal and vertical directions. Thus, 3D beamforming provides user-specific vertical tilting to the system to increase received signal power and reduce interference to other users.

Figure 2:
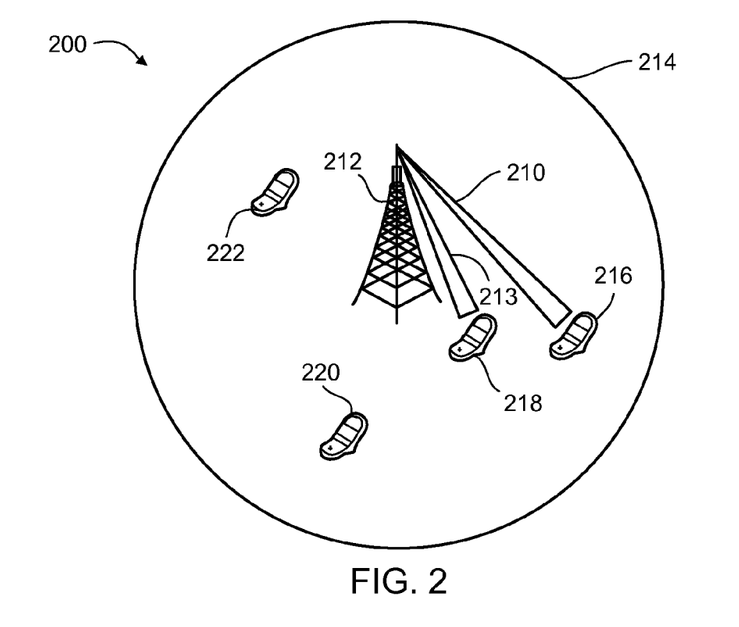
FIG. 2 is a block diagram of a mobile communication system applying three-dimensional beamforming according to certain embodiments.

For example, FIG. 2 is a block diagram of a mobile communication system 200 applying 3D beamforming according to certain embodiments. In FIG. 2, an eNodeB 212 within a cell 214 steers a first RF beam 210 to a first UE 216 and a second RF beam 213 to a second UE 218. Skilled persons will recognize from the disclosure herein that the eNodeB 212 may be configured to transmit a single RF beam at a time or more than the two RF beams 210, 213 at a time. For example, the eNodeB 212 may be configured to simultaneously transmit RF beams to each of a plurality of UEs 216, 218, 220, 222 within the cell 214. FIG. 2 shows an example in which different vertical tiltings are used depending on the position of the UEs 216, 218 relative to the eNodeB 212.

However, one challenge in communication systems with 3D beamforming is the large amount of CSI data that needs to be fed back from the UEs 216, 218 to the eNodeB 212. This is due to the use of a 2D antenna array (not shown) with a relatively large number of antennas that is required at the eNodeB 212 to enable beamforming in both horizontal and vertical directions. In certain embodiments, for example, the eNodeB 212 sends a pilot signal or reference signal for each antenna in the antenna array. The UEs 216, 218, knowing the characteristics and parameters of the reference signals ahead of time, use the reference signals to estimate the respective channels from the eNodeB 212. Thus, increasing the number of antennas increases the amount of CSI data and the feedback overhead, as compared to conventional systems that use only a 1D antenna array. The inventors of the present application have recognized that new codebooks are needed for vector quantization in such systems.

Thus, a method is disclosed herein to quantize a pre-coding matrix indicator (PMI) and feed it back from a UE to an eNodeB. In certain embodiments, the method utilizes LTE codebooks for vector quantization of optimal horizontal direction and a scalar quantizer to quantize the optimal vertical direction to a selected UE.

Figure 3:
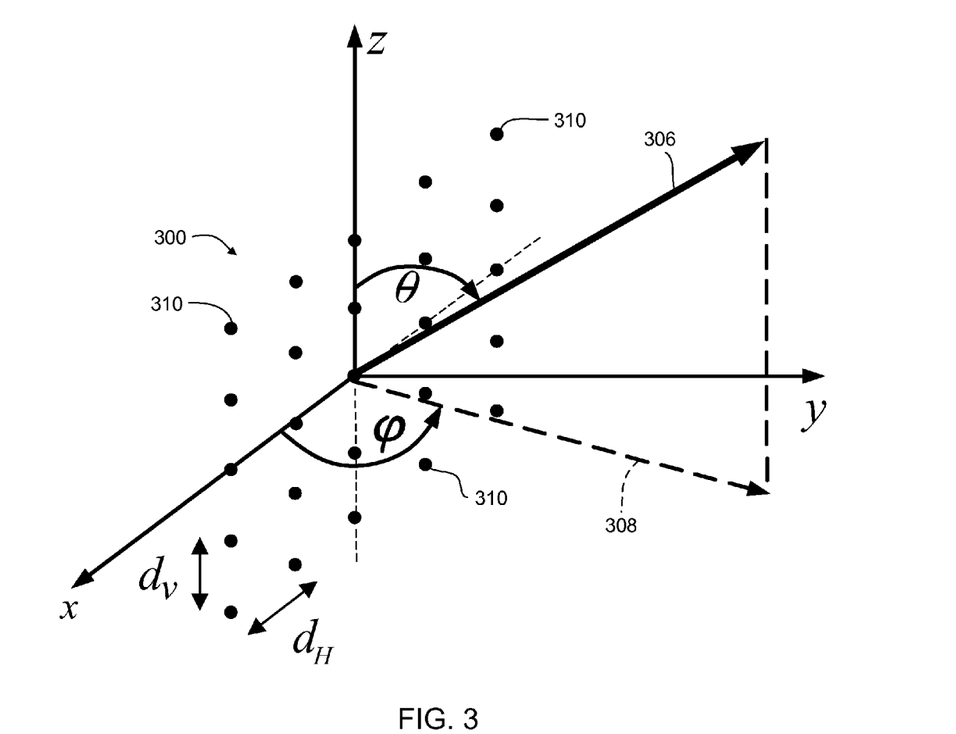
FIG. 3 schematically illustrates a two-dimensional antenna array according to one embodiment.

FIG. 3 schematically illustrates a 2D antenna array 300 arranged with respect to an x-axis, a y-axis, and a z-axis according to one embodiment. For illustrative purposes, a vector 306 corresponding to an RF beam direction is shown at a vertical angle $\theta$ with respect to the z-axis. A projection 308 of the vector 306 is shown in the x-y plane to illustrate that the vector 306 is pointing at a horizontal angle $\phi$ with respect to the x-axis.

The 2D antenna array 300 includes $N_H$ horizontal and $N_V$ vertical antenna elements 310 respectively separated in the horizontal direction (e.g., the x-direction) by distance $d_H$ and in the vertical direction (e.g., the z-direction) by distance $d_V$. In this example, $N_H=5$ antenna elements 310 and $N_V=5$ antenna elements 310. Skilled persons will recognize, however, that any number of antenna elements may be used in either direction to form a 2D array and that $N_H$ and $N_V$ do not necessarily need to be equal. In certain embodiments, the antenna elements 310 in one row can be both co-polarized and cross-polarized.

Figure 4:
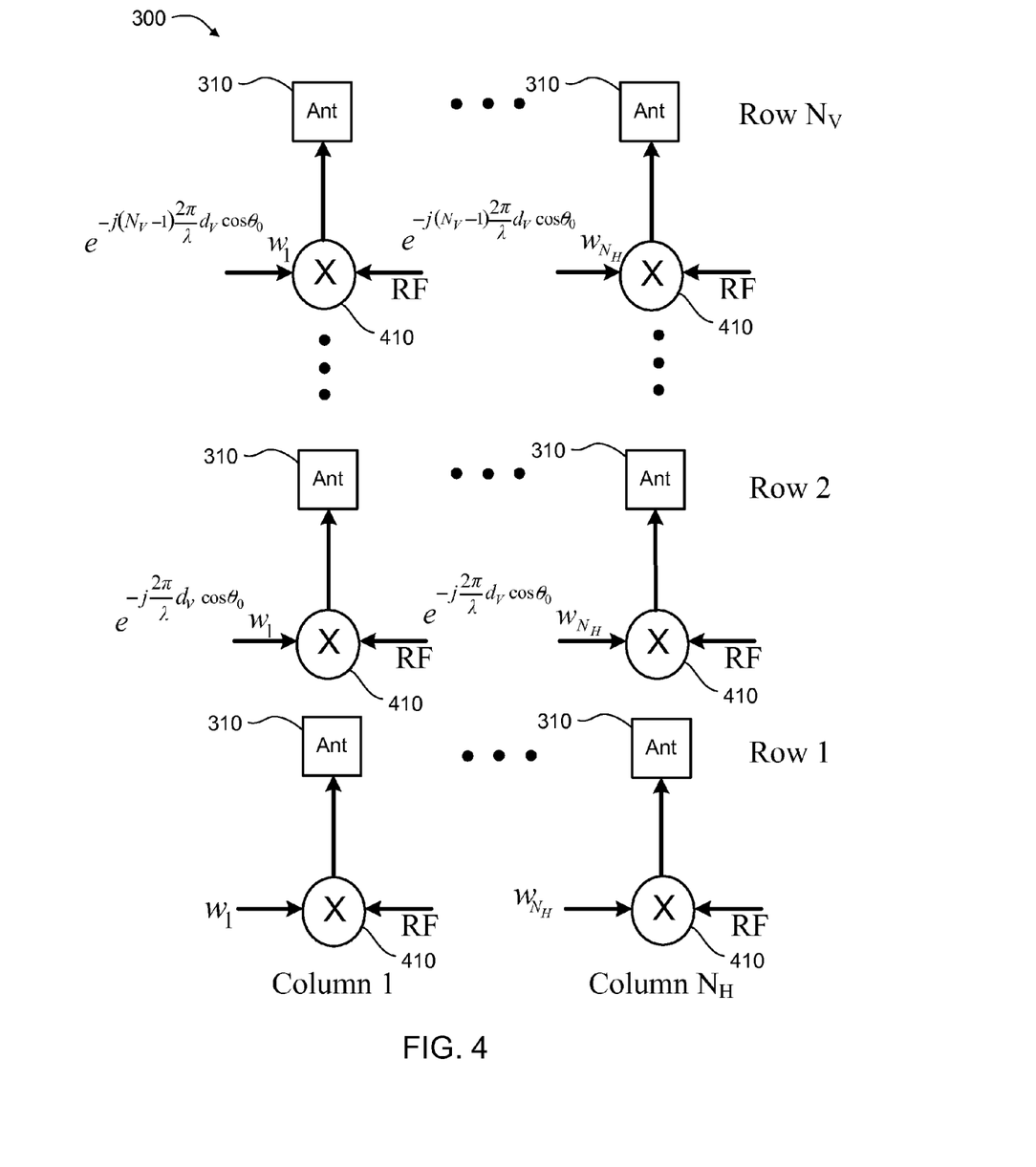
FIG. 4 is a block diagram of the two-dimensional antenna array shown in FIG. 3 illustrating respective phase shifting according to one embodiment.

Under these assumptions, the overall RF beam transmitted by the 2D antenna array 300 can be selectively pointed to a vertical angle $\theta_0$ (shown in FIG. 5) by introducing respective phase shifts to vertical antennas $n_v=1, 2, \ldots, N_V$. For example, FIG. 4 is a block diagram of the 2D antenna array 300 shown in FIG. 3 illustrating respective phase shifting 410 applied to the antenna elements 310 (Ant) according to one embodiment.

In column 1, the phase terms applied to the RF signal input to the antenna elements 310 of each row are:

Row 1: $w_1$,

Row 2: $e^{-j\frac{2\pi}{\lambda}d_v \cos\theta_0} w_1, \ldots$

Row $N_V$: $e^{-j(N_V-1)\frac{2\pi}{\lambda}d_v \cos\theta_0} w_1$.

where $w_1$ is a coefficient of the transmission channel corresponding to column 1, and $\lambda$ is the wavelength of the RF signal.

Each of the column of antenna elements 310 applies a respective coefficient of linear transmit antenna weight (e.g., column 1 uses $w_1$, column 2 uses $w_2, \ldots$, column $N_H$ uses $w_{N_H}$). Thus, in column $N_H$, the phase terms applied to the RF signal input to the antenna elements 310 of each row are:

Row 1: $w_{N_H}$,

Row 2: $e^{-j\frac{2\pi}{\lambda}d_v \cos\theta_0} w_{N_H}, \ldots$

Row $N_V$: $e^{-j(N_V-1)\frac{2\pi}{\lambda}d_v \cos\theta_0} w_{N_H}$.

Figure 5:
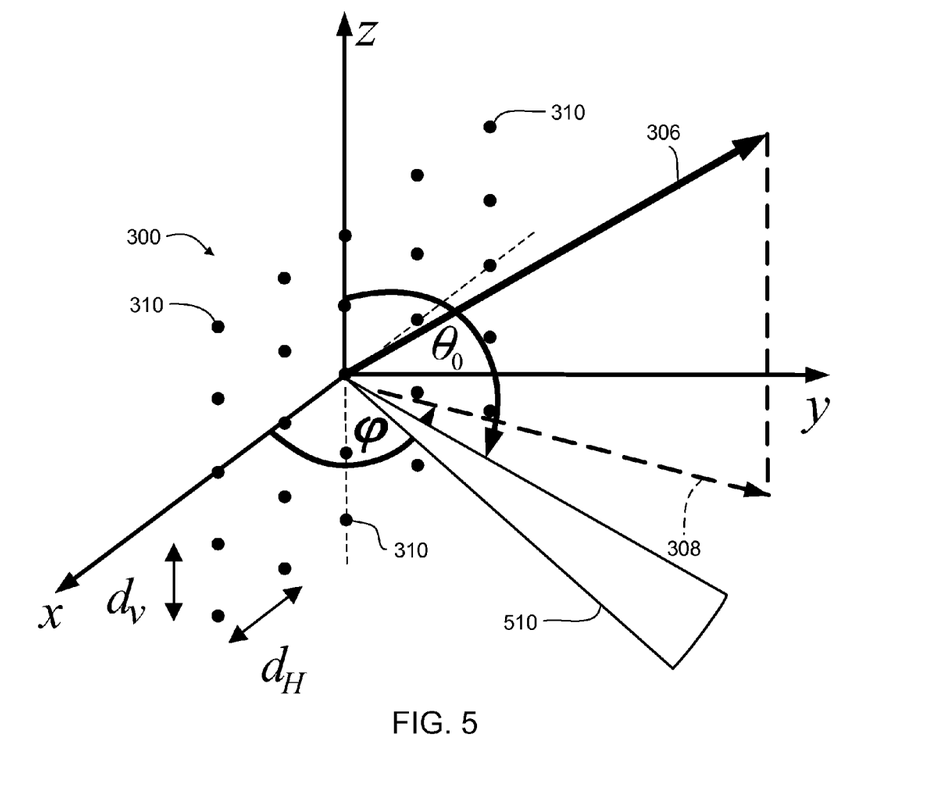
FIG. 5 schematically illustrates steering a beam in three dimensions with the two-dimensional antenna array shown in FIG. 3 according to one embodiment.

As shown in FIG. 5, the phase shifting of FIG. 4 results in steering an RF beam 510 horizontally based on the coefficients of linear transmit antenna weights $w_1, w_2, \ldots, w_{N_H}$, and vertically based on the parameter $\theta_0$.

Figure 6:
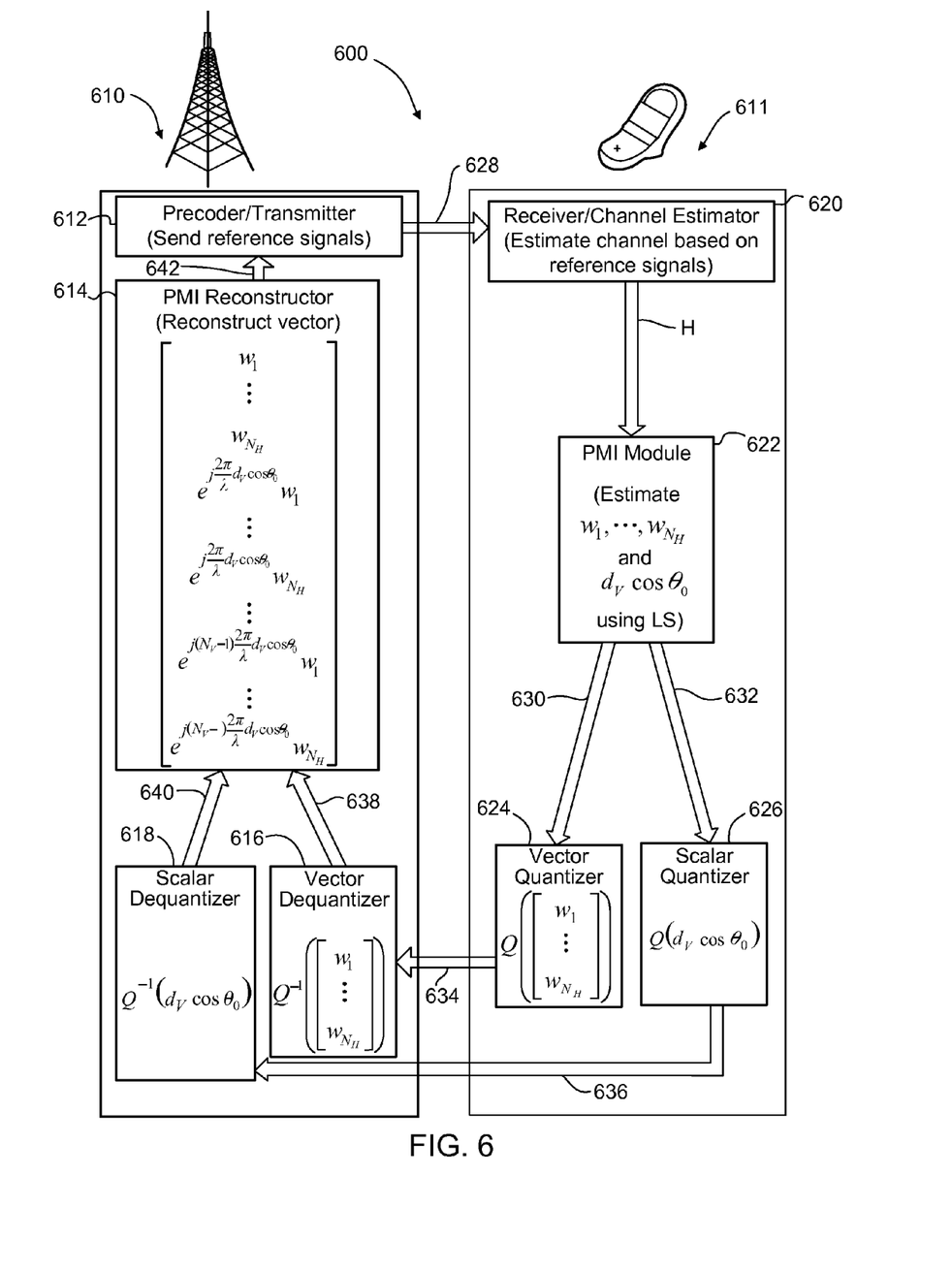
FIG. 6 is a simplified block diagram of a wireless MIMO system with three-dimensional beamforming according to one embodiment.

FIG. 6 is a simplified block diagram of a wireless MIMO system 600 with 3D beamforming according to one embodiment. The system 600 includes an eNodeB 610 and a UE 611. The eNodeB 610 includes circuitry for a precoder/transmitter 612, a PMI reconstructor 614, a vector dequantizer 616, and a scalar dequantizer 618. The UE 611 includes circuitry for a receiver/channel estimator 620, a PMI module 622, a vector quantizer 624, and a scalar quantizer 626.

The precoder/transmitter 612 of the eNodeB 610 is configured to transmit reference signals 628 to the UE 611. As discussed above, the precoder/transmitter 612 may transmit a reference signal for each antenna in a 2D antenna array (not shown) of the eNodeB 610, or for a subset of the antenna in the 2D antenna array. The receiver/channel estimator 620 of the UE 611 receives the references signals 628 and estimates an $N_H N_V \times N_r$ channel represented by a channel matrix H based on the received reference signals 628. $N_H$ is the number of transmit horizontal antennas in the eNodeB's 2D antenna array, $N_V$ is the number of transmit vertical antennas in the eNodeB's 2D antenna array, and $N_r$ is the number of receive antennas at the UE 611.

The receiver/channel estimator 620 provides the estimated channel matrix H to the PMI module 622. The PMI module 622 processes the estimated channel matrix H to calculate one or more PMI vectors and estimate values for $w_1, w_2, \ldots, w_{N_H}$ and $d_v \cos\theta_0$. The PMI module 622 may calculate the PMI vectors using a number of different methods. In one embodiment, for example, the PMI module 622 performs singular value decomposition (SVD) on the channel matrix H and finds the r dominant eigenvectors, where "r" is the transmission rank. In certain such embodiments, the r-th eigenvectors are in the form:

$$v_r = [v_{r,1}, \ldots, v_{r,N_H N_V}]^T,$$

where "T" denotes matrix transpose.

Conventional systems with base stations that transmit downlink signals using a 1D antenna array may use a PMI vector of the form:

$$u(w_1, \ldots, w_{N_H}) = [w_1, w_2, \ldots, w_{N_H}]^T.$$

However, certain embodiments disclosed herein use a PMI vector that accounts for the 2D antenna array of the eNodeB 610, and which is of the form:

$$u(w_1, \ldots, w_{N_H}, \theta_0) =$$
$$\left[ w_1, \ldots, w_{N_H}, e^{j\frac{2\pi}{\lambda}d_v \cos\theta_0} w_1, \ldots, e^{j\frac{2\pi}{\lambda}d_v \cos\theta_0} w_{N_H}, \ldots, \right.$$
$$\left. e^{j(N_V-1)\frac{2\pi}{\lambda}d_v \cos\theta_0} w_1, \ldots, e^{j(N_V-1)\frac{2\pi}{\lambda}d_v \cos\theta_0} w_{N_H} \right]^T.$$

To find optimal values for $w_1, \ldots, w_{N_H}, \theta_0$, the PMI module 622 solves the non-linear least square (LS) problem:

$$\min_{w_1, \ldots, w_{N_H}, \theta_0} \| v_r - u(w_1, \ldots, w_{N_H}, \theta_0) \|^2.$$

This LS problem may be solved using any LS problem solution. In one embodiment, for example, the LS problem is solved as follows:

$$\min_{w_1, \ldots, w_{N_H}, \theta_0} \| \ln(v_r) - Az \|^2, A = \begin{bmatrix} 1 & 0 & 0 & \ldots & 0 & 0 \\ 0 & 1 & 0 & \ldots & 0 & 0 \\ \vdots & \vdots & \vdots & \ldots & \vdots & \vdots \\ 0 & 0 & 0 & \ldots & 0 & 1 \\ 1 & 0 & 0 & \ldots & 0 & 1 \\ 0 & 1 & 0 & \ldots & 0 & 1 \\ \vdots & \vdots & \vdots & \ldots & \vdots & \vdots \\ 0 & 0 & 0 & \ldots & 1 & 1 \\ 1 & 0 & 0 & \ldots & 0 & 2 \\ \vdots & \vdots & \vdots & \ldots & \vdots & \vdots \\ 0 & 0 & 0 & \ldots & 1 & N_V - 1 \end{bmatrix},$$

$$z = \begin{bmatrix} \ln(w_1) \\ \vdots \\ \ln(w_{N_H}) \\ j\frac{2\pi}{\lambda}d_v \cos\theta_0 \end{bmatrix} \Rightarrow z = (A^T A)^{-1} A^T \ln(v_r).$$

The PMI module 622 then provides the estimated coefficients of linear transmit antenna weights $w_1, w_2, \ldots, w_{N_H}$ (as indicated at arrow 630) to the vector quantizer 624 and the estimated vertical phase shift parameter $d_v \cos\theta_0$ (as indicated at arrow 632) to the scalar quantizer 626.

The vector quantizer 624 quantizes the vector $$[w_1, \ldots, w_{N_H}]^T$$

using the $N_H$-Tx antenna LTE codebook or any other codebook (e.g., a WiMax codebook) known to both the UE 611 and the eNodeB 610, and sends an index 634 corresponding to an optimal codeword in the codebook to the eNodeB 610.

The scalar quantizer 626 quantizes $$\frac{2\pi}{\lambda} d_v \cos\theta_0$$

using scalar quantizing values known to both the UE 611 and the eNodeB 610, and sends an index 636 corresponding to an optimal level to the eNodeB 610.

At the eNodeB 610, the vector dequantizer 616 uses the index 634 to select the optimal codeword in the codebook to obtain $$[w_1, \ldots, w_{N_H}]^T.$$

which the vector dequantizer 616 provides (as indicated at arrow 638) to the PMI reconstructor 614.

Also at the eNodeB 610, the scalar dequantizer 618 uses the index corresponding to the optimal level to obtain $$d_v \cos\theta_0.$$

which the scale dequantizer 618 provides (as indicated at arrow 640) to the PMI reconstructor 614.

Based on the information from the vector dequantizer 616 and the scalar dequantizer 618, the PMI reconstructor 614 of the eNodeB 610 reconstructs the PMI vector in the form:

$$\left[ w_1, \ldots, w_{N_H}, e^{j\frac{2\pi}{\lambda}d_v \cos\theta_0} w_1, \ldots, e^{j\frac{2\pi}{\lambda}d_v \cos\theta_0} w_{N_H}, \ldots, \right.$$
$$\left. e^{j(N_V-1)\frac{2\pi}{\lambda}d_v \cos\theta_0} w_1, \ldots, e^{j(N_V-1)\frac{2\pi}{\lambda}d_v \cos\theta_0} w_{N_H} \right]^T.$$

The PMI reconstructor 614 provides (as indicated at arrow 642) the reconstructed PMI vector to the precoder/transmitter 612 for use in downlink data transmission to the UE 611. For example, in single-user MIMO, the eNodeB 610 may use the reconstructed PMI vector to pre-code the next downlink data to be sent to the UE 611. In multi-user MIMO, however, the PMI constructor 614 reconstructs a plurality of PMI vectors from data received from respective UEs. Then, depending on the beamforming scheme, the eNodeB 610 calculates new pre-coding matrices to cancel or reduce interference between the multiple users.

Figure 7:
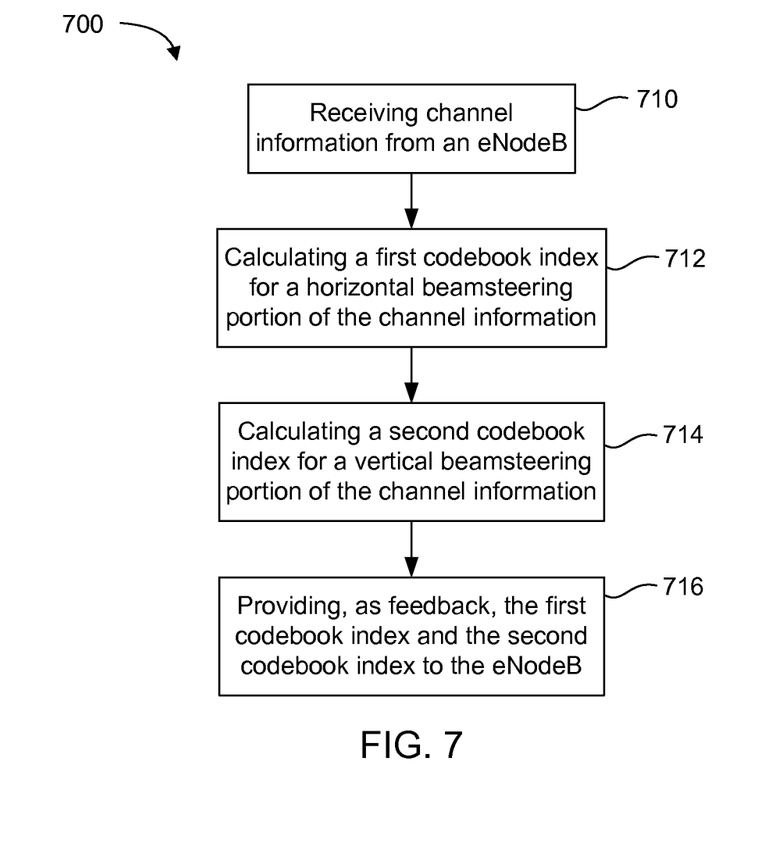
FIG. 7 is a flowchart of a method for channel information feedback in a MIMO network with three-dimensional beamforming according to one embodiment.

FIG. 7 is a flowchart of a method 700 for channel information feedback in a MIMO network with 3D beamsteering according to one embodiment. The method 700 includes receiving 710 channel information from an eNodeB and calculating 712 a first codebook index for a horizontal beamsteering portion of the channel information. Calculating the first codebook index includes, according to certain embodiments, performing vector quantization on the horizontal beamsteering portion of the channel information. The method 700 further includes calculating 714 a second codebook index for a vertical beamsteering portion of the channel information. Calculating the second codebook index includes, according to certain embodiments, performing scalar quantization of a parameter associated with a vertical steering angle. The method 700 also includes providing 716, as feedback, the first codebook index and the second codebook index.

Figure 8:
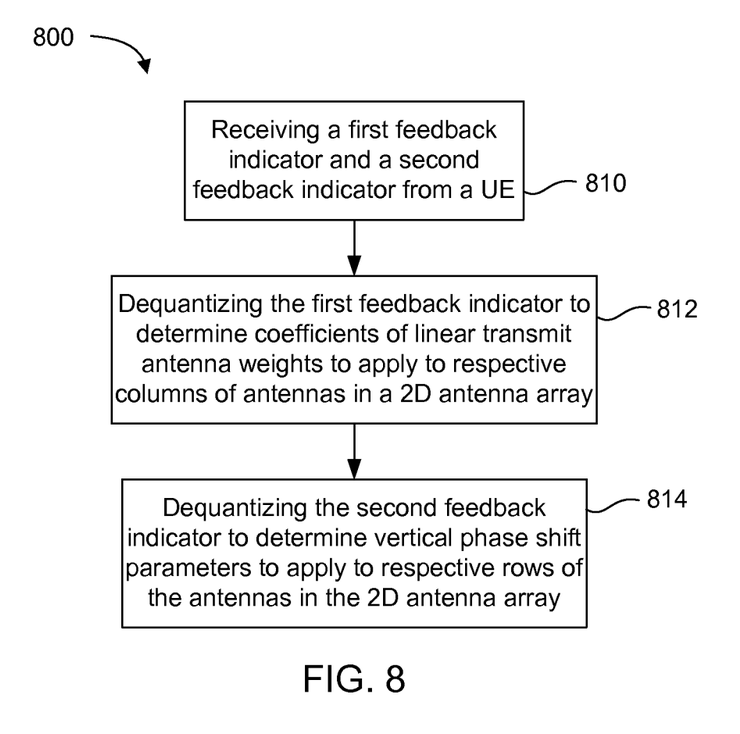
FIG. 8 is a flowchart of a method for three-dimensional beamforming in a transmitter station with a two-dimensional antenna array according to one embodiment.

FIG. 8 is a flowchart of a method 800 for 3D beamforming in a transmitter station with a 2D antenna array according to one embodiment. The method 800 includes receiving 810 a first feedback indicator from a UE and dequantizing 812 the first feedback indicator to determine coefficients of linear transmit antenna weights to apply to respective columns of antennas in the 2D antenna array. The method 800 further includes dequantizing 814 the second feedback indicator to determine vertical phase shift parameters to apply to respective rows of the antennas in the 2D antenna array.

Figure 9:
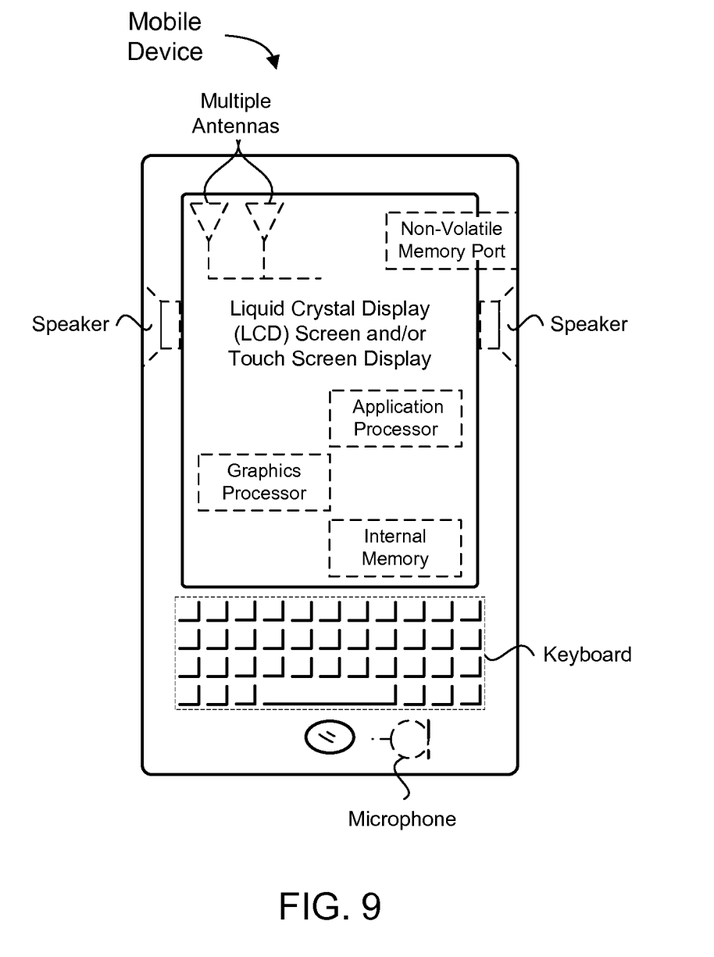
FIG. 9 illustrates an example user equipment that may be used with certain embodiments disclosed herein.

FIG. 9 provides an example illustration of the mobile device, such as a UE, a mobile station (MS), a mobile wireless device, a mobile communication device, a tablet, a handset, or other type of mobile wireless device that may be used with certain embodiments disclosed herein. The mobile device can include one or more antennas configured to communicate with transmission station, such as a base station (BS), an evolved Node B (eNB), a base band unit (BBU), a remote radio head (RRH), a remote radio equipment (RRE), a relay station (RS), a radio equipment (RE), or other type of wireless wide area network (WWAN) access point. The mobile device can be configured to communicate using at least one wireless communication standard including 3GPP LTE, WiMAX, High Speed Packet Access (HSPA), Bluetooth, and WiFi. The mobile device can communicate using separate antennas for each wireless communication standard or shared antennas for multiple wireless communication standards. The mobile device can communicate in a wireless local area network (WLAN), a wireless personal area network (WPAN), and/or a WWAN.

FIG. 9 also provides an illustration of a microphone and one or more speakers that can be used for audio input and output from the mobile device. The display screen may be a liquid crystal display (LCD) screen, or other type of display screen such as an organic light emitting diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the mobile device. A keyboard may be integrated with the mobile device or wirelessly connected to the mobile device to provide additional user input. A virtual keyboard may also be provided using the touch screen.

Some of the infrastructure that can be used with embodiments disclosed herein is already available, such as general-purpose computers, mobile phones, computer programming tools and techniques, digital storage media, and communications networks. A computing device may include a processor such as a microprocessor, microcontroller, logic circuitry, or the like. The computing device may include a computer-readable storage device such as non-volatile memory, static random access memory (RAM), dynamic RAM, read-only memory (ROM), disk, tape, magnetic, optical, flash memory, or other computer-readable storage medium.

Various aspects of certain embodiments may be implemented using hardware, software, firmware, or a combination thereof. A component or module may refer to, be part of, or include an application specific integrated circuit (ASIC), an electronic circuit, a processor, (shared, dedicated, or group) and/or memory (shared, dedicated or group) that execute one or more software or firmware programs, a combinational logic circuit, and/or other suitable components that provide the described functionality. As used herein, a software module or component may include any type of computer instruction or computer executable code located within or on a non-transitory computer-readable storage medium. A software module or component may, for instance, comprise one or more physical or logical blocks of computer instructions, which may be organized as a routine, program, object, component, data structure, etc., which performs one or more tasks or implements particular abstract data types.

In certain embodiments, a particular software module or component may comprise disparate instructions stored in different locations of a computer-readable storage medium, which together implement the described functionality of the module or component. Indeed, a module or component may comprise a single instruction or many instructions, and may be distributed over several different code segments, among different programs, and across several computer-readable storage media. Some embodiments may be practiced in a distributed computing environment where tasks are performed by a remote processing device linked through a communications network.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the invention is not to be limited to the details given herein, but may be modified within the scope and equivalents of the appended claims.

Those having skill in the art will appreciate that many changes may be made to the details of the above-described embodiments without departing from the underlying principles of the invention. The scope of the present invention should, therefore, be determined only by the following claims.

The invention claimed is:

1. An evolved Node B (eNodeB), comprising:
    a two-dimensional (2D) antenna array for three-dimensional (3D) steering of a radio frequency (RF) beam toward a first user equipment (UE);
    a scalar dequantizer to dequantize a first feedback indicator received from the first UE to determine vertical phase shift parameters to apply to respective rows of the antennas in the 2D antenna array for steering the RF beam in a vertical direction;
    a vector dequantizer to dequantize a second feedback indicator received from the first UE to determine coefficients of linear transmit antenna weights to apply to respective columns of antennas in the 2D antenna array for steering the RF beam in a horizontal direction;
    a pre-coding matrix indicator (PMI) reconstructor to calculate a PMI vector comprising the coefficients multiplied by the vertical phase shift parameters;
    a precoder to, in a multi-user multiple-input multiple-output (MIMO) mode:
        combine the calculated PMI vector with one or more reconstructed PMI vectors corresponding to one or more second UEs, respectively;
        calculate, using the combination, a pre-coding matrix based on a beamforming scheme to reduce interference between the first UE and the one or more second UEs; and
        use the calculated pre-coding matrix to pre-code downlink data; and
    a transmitter to transmit the pre-coded downlink data to the first UE.

2. The eNodeB of claim 1, wherein the vector dequantizer uses a codebook known to the eNodeB and the first UE to dequantize the coefficients.

3. The eNodeB of claim 1, wherein the precoder, in a single-user MIMO mode, is configured to use the calculated PMI vector to generate the pre-coded downlink data.

4. A method for an evolved Node B (eNodeB), the method comprising:

performing scalar dequantization to dequantize a first feedback indicator received from a first user equipment (UE) to determine vertical phase shift parameters to apply to respective rows of antennas in a two-dimensional (2D) antenna array for steering a radio frequency (RF) beam in a vertical direction;

performing vector dequantization to dequantize a second feedback indicator received from the first UE to determine coefficients of linear transmit antenna weights to apply to respective columns of antennas in the 2D antenna array for steering the RF beam in a horizontal direction;

calculating a pre-coding matrix indicator (PMI) vector comprising the coefficients multiplied by the vertical phase shift parameters;

in a multi-user multiple-input multiple-output (MIMO) mode:
  combining the calculated PMI vector with one or more reconstructed PMI vectors corresponding to one or more second UEs, respectively;
  calculating, using the combination, a pre-coding matrix based on a beamforming scheme to reduce interference between the first UE and the one or more second UEs; and
  using the calculated pre-coding matrix to pre-code downlink data; and
transmitting the pre-coded downlink data to the first UE.

5. The method claim 4, wherein performing the vector dequantization comprises using a codebook known to the eNodeB and the first UE to dequantize the coefficients.

6. The method of claim 4, in a single-user MIMO mode, using the calculated PMI vector to generate the pre-coded downlink data.

7. At least one non-transitory computer-readable storage medium having stored thereon instructions that, when executed by one or more processors, cause the one or more processors to perform operations comprising:

scalar dequantization to dequantize a first feedback indicator received from a first user equipment (UE) to determine vertical phase shift parameters to apply to respective rows of antennas in a two-dimensional (2D) antenna array for steering a radio frequency (RF) beam in a vertical direction;

vector dequantization to dequantize a second feedback indicator received from the first UE to determine coefficients of linear transmit antenna weights to apply to respective columns of antennas in the 2D antenna array for steering the RF beam in a horizontal direction;

calculate a pre-coding matrix indicator (PMI) vector comprising the coefficients multiplied by the vertical phase shift parameters;

in a multi-user multiple-input multiple-output (MIMO) mode:
  combine the calculated PMI vector with one or more reconstructed PMI vectors corresponding to one or more second UEs, respectively;
  calculate, using the combination, a pre-coding matrix based on a beamforming scheme to reduce interference between the first UE and the one or more second UEs; and
  use the calculated pre-coding matrix to pre-code downlink data; and
transmit the pre-coded downlink data to the first UE.

8. The at least one non-transitory computer-readable storage medium claim 7, wherein to perform the vector dequantization, the operations further use a codebook known to the eNodeB and the first UE to dequantize the coefficients.

9. The at least one non-transitory computer-readable storage medium of claim 7, in a single-user MIMO mode, the operations further use the calculated PMI vector to generate the pre-coded downlink data.

\* \* \* \* \*